(12) United States Patent
Guy

(10) Patent No.: US 11,858,640 B2
(45) Date of Patent: Jan. 2, 2024

(54) AIRCRAFT SUITE

(71) Applicant: Safran Seats GB Limited, Cwmbran (GB)

(72) Inventor: Julian Guy, Cwmbran (GB)

(73) Assignee: Safran Seats GB Limited, Cwmbran (GB)

( * ) Notice: Subject to any disclaimer, the term of this patent is extended or adjusted under 35 U.S.C. 154(b) by 464 days.

(21) Appl. No.: 17/256,071

(22) PCT Filed: Jun. 26, 2019

(86) PCT No.: PCT/GB2019/051796
§ 371 (c)(1),
(2) Date: Dec. 24, 2020

(87) PCT Pub. No.: WO2020/002907
PCT Pub. Date: Jan. 2, 2020

(65) Prior Publication Data
US 2021/0221517 A1 Jul. 22, 2021

(30) Foreign Application Priority Data

Jun. 27, 2018 (GB) ..................................... 1810516

(51) Int. Cl.
*B64D 11/06* (2006.01)
*B64D 11/00* (2006.01)

(52) U.S. Cl.
CPC ...... *B64D 11/0606* (2014.12); *B64D 11/0641* (2014.12); *B64D 11/0626* (2014.12);
(Continued)

(58) Field of Classification Search
CPC ............ B64D 11/0606; B64D 11/0641; B64D 11/0626; B64D 11/0631;
(Continued)

(56) References Cited

U.S. PATENT DOCUMENTS 10,214,287 B2 * 2/2019 Valentine, Jr. ......... B64D 11/00
2002/0109390 A1 8/2002 Hagiike
(Continued)

FOREIGN PATENT DOCUMENTS

CN 104859489 A 8/2015
DE 102004037914 A1 3/2006
(Continued)

OTHER PUBLICATIONS

China Patent Application 201980043327.8, Office Action, dated Apr. 14, 2023.
(Continued)

*Primary Examiner* — Valentina Xavier
(74) *Attorney, Agent, or Firm* — Kilpatrick Townsend & Stockton LLP

(57) ABSTRACT

Described is an aircraft suite having an aircraft seat for use by a passenger, the aircraft suite also having a controller, for controlling a number of output states of the aircraft suite, the controller having a logic condition receiver for receiving a logic condition input, and distance measurement equipment for measuring a distance between a first location within the suite and a second location within the suite, and providing a distance input to a distance receiver of the controller, wherein, in use, the controller controls at least one of the output states of the aircraft suite based upon both the logic condition input and the distance input. The invention also provides a method of controlling an environment within an aircraft suite.

8 Claims, 8 Drawing Sheets

(52) U.S. Cl.
CPC .. *B64D 11/0631* (2014.12); *B64D 2011/0038* (2013.01); *B64D 2011/0053* (2013.01)

(58) Field of Classification Search
CPC .... B64D 2011/0038; B64D 2011/0053; B64D 11/00; B64D 11/0636; B64D 11/0638; B64D 11/0639; B64D 11/003
See application file for complete search history.

(56) References Cited

U.S. PATENT DOCUMENTS

| | | | |
|---|---|---|---|
| 2006/0032979 A1* | 2/2006 | Mitchell | B64D 11/0696 244/118.6 |
| 2014/0137574 A1 | 5/2014 | Hothi | |
| 2018/0009533 A1 | 1/2018 | Monfraix | |
| 2018/0304773 A1 | 10/2018 | Lerouge et al. | |
| 2021/0206508 A1* | 7/2021 | Cabos | B64D 11/0636 |

FOREIGN PATENT DOCUMENTS

| | | |
|---|---|---|
| EP | 0779207 A1 | 6/1997 |
| EP | 0881145 A2 | 12/1998 |
| EP | 2910471 A1 | 8/2015 |
| WO | 2016191560 A1 | 12/2016 |
| WO | 2017176811 A1 | 10/2017 |

OTHER PUBLICATIONS

China Patent Application 201980043327.8, Search Report, dated Apr. 7, 2023.
International Patent Application No. PCT/GB2019/051796, Invitation to Pay Additional Search Fees and, Where Applicable, Protest Fee, dated Sep. 24, 2019
International Patent Application No. PCT/GB2019/051796, Search Report and Written Opinion, dated Nov. 20, 2019
United Kingdom Patent Application No. 1810516.3, Search Report, dated Nov. 28, 2018.

* cited by examiner

AIRCRAFT SUITE

BACKGROUND OF THE INVENTION

The present disclosure relates to aircraft suites.

The present invention concerns an aircraft suite. More particularly, but not exclusively, this invention concerns an aircraft suite comprising an aircraft seat for use by a passenger, the aircraft suite also comprising a controller, for controlling a number of output states of the aircraft suite, the controller having a logic condition receiver for receiving a logic condition input.

The invention also concerns a method of controlling an environment within an aircraft suite.

WO 2016/191560 discloses an aircraft lighting system that is adjustable based on a location of, for example, a drinks trolley. For example, the lighting around a passenger seat can be activated when the drinks trolley approaches. The location of the trolley is detected using an RFID tag.

In other prior art aircraft suites, various lighting and seat settings can be varied based on a passenger activating the light/seat, for example.

However, none of these examples provide for different suite settings, based on intelligently deciding what the best seat/lighting setting etc. (e.g. suite environment), for a given scenario might be. The present invention seeks to mitigate the above-mentioned problems. Alternatively or additionally, the present invention seeks to provide an improved aircraft suite.

SUMMARY OF THE INVENTION

The present invention provides, according to a first aspect, an aircraft suite comprising an aircraft seat for use by a passenger, the aircraft suite also comprising a controller, for controlling a number of output states of the aircraft suite, the controller having a logic condition receiver for receiving a logic condition input, and distance measurement equipment, for measuring a distance between a first location within the suite and a second location within the suite, and providing a distance input to a distance receiver of the controller, wherein, in use, the controller controls at least one of the output states of the aircraft suite based upon both the logic condition input and the distance input.

Having distance measurement equipment enables a distance between a first location and a second location within the suite to be measured. This allows the distance measured (or a distance input corresponding to the distance measured) to give an indication of a location of an object within the suite. Hence, this distance input can be supplied to the controller. In combination with the logic condition that the controller is also supplied with, the controller can control at least one output state of the aircraft suite. That output state is pre-decided, based on the logic condition and the distance input scenario.

Preferably, the distance measurement equipment comprises a signal emitter for emitting a signal at a first time, and a signal receiver, for receiving the signal at a second time, a time lag between the first and second times corresponding to the distance being measured. Hence, the time lag (elapsed time) is an indication of the distance and can be used to provide the distance input. The signal emitter may emit an infrared or an ultrasound signal. The signal receiver is suitable for receiving the signal emitted by the signal emitter.

More preferably, the signal emitter and signal receiver are located substantially adjacent each other at the first location and wherein an object at the second location reflects the signal emitted from the signal emitter back to the signal receiver.

Alternatively, the signal emitter and signal receiver may be located at substantially different locations within the aircraft suite. For example, the signal emitter may be located at the first location and the signal receiver may be located at the second location. For example, the signal receiver may be located on a moveable object, and the distance from the moveable object to the first location is the distance being measured.

Preferably, the first location within the aircraft suite is on a piece of furniture of the aircraft suite. More preferably, the first location within the aircraft suite corresponds to an outer surface of a piece of furniture of the aircraft suite.

More preferably, the piece of furniture is fixedly mounted within the aircraft suite. The piece of furniture may be fixed in position relative to the aircraft suite.

Preferably, the second location within the aircraft suite corresponds to a location of at least part of a moveable object within the aircraft suite.

The moveable object may not be a part of the aircraft suite, such as a passenger or a piece of luggage. Alternatively, the moveable object is a moveable item of furniture of the aircraft suite.

Preferably, the logic condition input relates to an aircraft state, an aircraft cabin state and/or an aircraft suite state. More preferably, the logic condition input relates to an aircraft state, and/or an aircraft cabin state.

The logic condition input may relate to an aircraft state and wherein the aircraft state represents a status of the aircraft, such as: "boarding", "ready for taxi, take-off or landing (TTL)", "in flight", "experiencing turbulence", "landed" and/or "lifejacket inspection check".

The logic condition input may relate to an aircraft cabin state and wherein the aircraft cabin state represents a status of the aircraft cabin, such as: "lights dimmed for night-time".

The logic condition input may relate to an aircraft suite state and wherein the aircraft suite state represents a status of the aircraft suite, such as: "seat in bed configuration", "lights low/off", "furniture being deployed" and/or "furniture being stowed". More preferably, the aircraft suite state represents a status of the aircraft suite, such as: "seat in bed configuration", "lights low/off" and/or "furniture being stowed".

Of course, the logic condition input may relate to a combination of states. For example, the controller controls at least one of the output states of the aircraft suite based upon a logic condition input, that is dependent on more than one state, and the distance input.

Preferably, the output state controlled by the controller helps provide a desired or required aircraft suite environment and may relate to a light level of the aircraft suite, a temperature of the aircraft suite or a part of the suite, a message or warning displayed within the suite, a message or warning displayed externally to the suite and/or a deployment/stowage condition of a piece of furniture of the suite. The output state controlled by the controller may relate to a light level of the aircraft suite, a temperature of the aircraft suite or a part of the suite, a message or warning displayed within the suite and/or a message or warning displayed externally to the suite. The output state controlled by the controller may relate a temperature of the aircraft suite or a part of the suite, a message or warning displayed within the suite, a message or warning displayed externally to the suite and/or a deployment/stowage condition of a piece of furniture of the suite. The output state controlled by the controller may relate to a temperature of the aircraft suite or a part of the suite, a message or warning displayed within the suite and/or a message or warning displayed externally to the suite.

In some examples, the first location is on a piece of furniture of the aircraft suite and the second location is the nearest object to the first location in a path of deployment/stowage of a piece of furniture, wherein the logic condition input relates to an aircraft suite state of deployment/stowage of the item of furniture, and wherein the output state controlled is deployment/stowage of the piece of furniture, such that, in use, if the distance measurement equipment measures a shorter distance than expected, indicating a passenger or item of luggage may be in the path of deployment/stowage, and the piece of furniture is being deployed/stowed, then the controller controls the output state such that deployment/stowage movement of the item of furniture is ceased. This allows the deployment/stowage to be controlled by a one touch process (i.e. a passenger touches a button once and deployment/stowage is initiated and continues until complete or until an object in the path is detected) whilst still being safe and preventing objects getting stuck.

In some examples, the first location is on a piece of furniture of the aircraft suite and the second location is the nearest object to the first location in a path of stowage of a piece of furniture, wherein the logic condition input relates to an aircraft suite state of stowage of the item of furniture, and wherein the output state controlled is stowage of the piece of furniture, such that, in use, if the distance measurement equipment measures a shorter distance than expected, indicating a passenger or item of luggage may be in the path of stowage, and the piece of furniture is being stowed, then the controller controls the output state such that stowage movement of the item of furniture is ceased. This allows the stowage to be controlled by a one touch process (i.e. a passenger touches a button once and stowage is initiated and continues until complete or until an object in the path is detected) whilst still being safe and preventing objects getting stuck.

The deployment/stowage movement of the item of furniture may be resumed if/when the passenger or item of luggage is no longer in the path of deployment/stowage.

In some examples, the first location is on a piece of furniture of the aircraft suite and the second location is the nearest object to the first location across an open portion of the aircraft suite, wherein the logic condition input relates to an aircraft state of ready for taxi, take-off or landing, and wherein the output state controlled is a message/warning light within the suite and/or externally to a member of cabin crew, such that, in use, if the distance measurement equipment measures a shorter distance than expected, indicating an item of luggage may be in the open portion of the aircraft suite, and the aircraft is ready for taxi, take-off or landing, then the controller controls the output state such that the passenger and/or cabin crew are made aware. The output state making the passenger and/or cabin crew aware (e.g. a warning light and/or sound) may turn off when the item of luggage is moved from the open portion of the aircraft suite.

In some examples, the first location is on a piece of furniture of the aircraft suite and the second location is the nearest object to the first location in a direction towards the aircraft seat, wherein the logic condition input relates to an aircraft state of ready for taxi, take-off or landing, and wherein the output state controlled is a message/warning light within the suite and/or externally to a member of cabin crew, such that, in use, if the distance measurement equipment measures the distance to the aircraft seat, indicating that a passenger is not seated in the aircraft seat, and the aircraft is ready for taxi, take-off or landing, then the controller controls the output state such that the passenger and/or cabin crew are made aware. The output state may be a warning light and/or sound. The output state may turn off when the passenger returns to the aircraft seat.

In some examples, the first location is on a piece of furniture of the aircraft suite and the second location is the nearest object to the first location in a direction towards the aircraft seat, wherein the logic condition input relates to an aircraft state of in flight, and wherein the output state controlled is a heating or cooling condition within the suite, such as heating of the aircraft seat, such that, in use, if the distance measurement equipment measures a shorter distance than the distance to the aircraft seat, indicating that a passenger is seated in the aircraft seat, and the aircraft is in flight, then the controller controls the output state such that heating, cooling air circulation and/or air conditioning in the aircraft suite is turned on.

The heating, cooling, air circulation and/or air conditioning in the aircraft suite may be off if/when the passenger leaves the aircraft seat.

In some examples, the first location is on a piece of furniture of the aircraft suite and the second location is the nearest object to the first location in a direction towards the aircraft seat, wherein the logic condition input relates to an aircraft state of experiencing turbulence, and wherein the output state controlled is a message/warning light within the suite and/or externally to a member of cabin crew, such that, in use, if the distance measurement equipment measures the distance to the aircraft seat, indicating that a passenger is not seated in the aircraft seat, and the aircraft is experiencing turbulence, then the controller controls the output state such that the passenger and/or cabin crew are made aware. The output state making the passenger and/or cabin crew aware (e.g. a warning light and/or sound) may turn off when the passenger returns to the aircraft seat.

In some examples, the first location is on a piece of furniture of the aircraft suite and the second location is the nearest object to the first location in a path of deployment/stowage of a table of the aircraft suite, wherein the logic condition input relates to an aircraft state of ready for taxi, take-off or landing, and wherein the output state controlled is a message/warning light within the suite and/or externally to a member of cabin crew, such that, in use, if the distance measurement equipment measures a shorter or longer distance than expected, indicating that the table is not stowed, and the aircraft is ready for taxi, take-off or landing, then the controller controls the output state such that the passenger and/or cabin crew are made aware. The output state making the passenger and/or cabin crew aware (e.g. a warning light and/or sound) may turn off when the table is stowed.

In some examples, the first location is inside a storage container of the aircraft suite and the second location is the nearest object to the first location across the storage container, wherein the logic condition input relates to an aircraft state of landed, and wherein the output state controlled is a message/warning light within the suite and/or externally to a member of cabin crew, such that, in use, if the distance measurement equipment measures a shorter distance than expected, indicating that an item of luggage is within the storage container, and the aircraft is landed, then the controller controls the output state such that the passenger and/or cabin crew are made aware. This prevents luggage being left behind in the suit by the passenger on leaving the aircraft.

In some examples, the first location is on a piece of furniture of the aircraft suite and the second location is the nearest object to the first location across a lifejacket stowage area, wherein the logic condition input relates to an aircraft state of lifejacket inspection check, and wherein the output state controlled is a message/warning light within the suite and/or externally to a member of cabin crew, such that, in use, if the distance measurement equipment measures a longer distance than expected, indicating that the lifejacket has been removed, and the aircraft is having an inspection check, then the controller controls the output state such that the maintenance crew and/or cabin crew are made aware.

In some examples, the first location is on a piece of furniture of the aircraft suite on one side on an entrance to the suite and the second location is the nearest object to the first location across the entrance to the suite, wherein the logic condition input relates to an aircraft state of boarding, and wherein the output state controlled is a message within the suite and/or a lighting level within the suite, such that, in use, if the distance measurement equipment measures a shorter distance than expected, indicating that a passenger has entered the suite, and the aircraft is boarding, then the controller controls the output state such that a welcoming message can be displayed and/or welcome lighting can be illuminated.

In some examples, the first location is on a piece of furniture of the aircraft suite and the second location is the nearest object to the first location across the suite from the first location, wherein the logic condition input relates to an aircraft cabin state of lights dimmed for night-time and/or an aircraft suite status of low light level and/or an aircraft suite status of seat in bed configuration, and wherein the output state controlled is a lighting level within the suite, such that, in use, if the distance measurement equipment measures a shorter distance than expected, indicating that a passenger has got out of bed, and the aircraft suite and/or aircraft cabin have a low light level, then the controller controls the output state such that a light can be turned on so as to help the passenger see.

In some examples, the controller receives a number of logic condition inputs and a number of distance inputs and controls a number of output states of the aircraft suite based on the relevant logic condition and distance inputs.

According to a second aspect of the invention there is also provided a method of controlling an environment within an aircraft suite, the aircraft suite comprising an aircraft seat for use by a passenger, the method comprising the steps of measuring a distance between a first location within the suite and a second location within the suite, and providing a distance input, providing a logic condition input, and controlling a number of output states of the aircraft suite, based upon both the logic condition input and the distance input.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
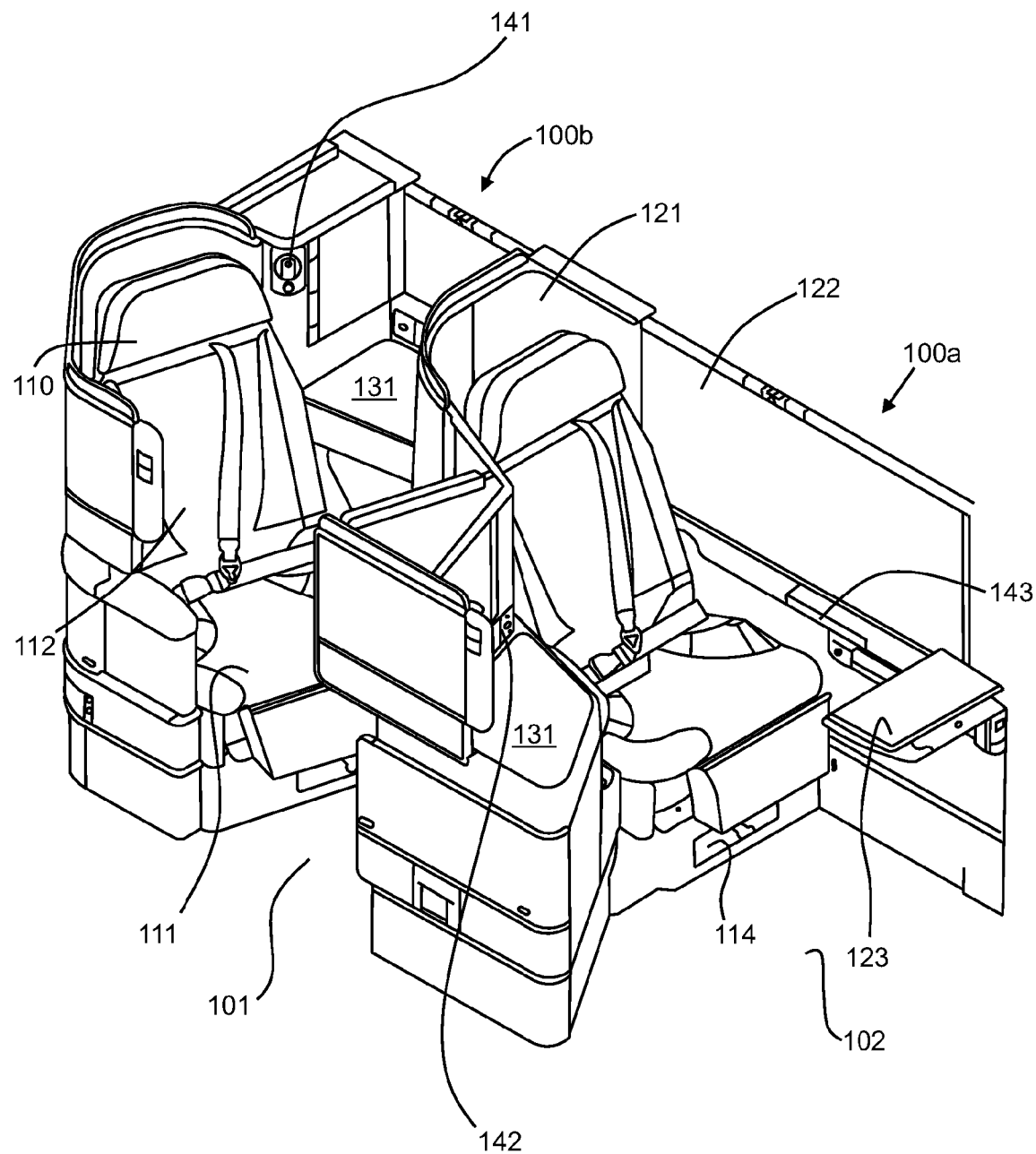
FIG. 1 shows a perspective view of two adjacent aircraft suites, in accordance with a first embodiment of the invention.

FIG. 1 shows a perspective view of two adjacent aircraft suites 100a, 100b, in accordance with a first embodiment of the invention. Each suite 100a, 100b (generally, 100) includes a seat 110, comprising a seat pan 111 and a backrest 112. Also provided is a life vest container 114 located under the seat 110. Not seen in FIG. 1, is an ottoman 113 located opposite the seat 110, which provides a footrest function for a passenger sat in the seat 110. The ottoman 113 may also make up part of a bed surface when the seat 110 is moved to a bed configuration.

The seat 110 is contained within a substantially oval-shaped shroud 121 that defines the boundary of the aircraft suite 100. The shroud 121 extends around the seat 110. The shroud 121 has a gap where an entrance/exit area 101 to the suite 100 is provided. This entrance/exit 101 leads to an open area 102 in front of the seat 110 and between the seat 110 and the ottoman 113.

Each suite 100 also has a privacy screen 122 as a moveable partition of the shroud 121. Each suite also comprises at least one passenger storage area 131 and a table 123.

The suite 100 is also provided with a heating/cooling system 143, a lighting system 141 and also a warning light/message light system 142.

The suite comprises a control unit (not shown), which is connected to the heating/cooling system 143, the lighting system 141 and the warning/message light system 142. It is also connected to a deployment/stowage mechanism (not shown) of the seat 110. The controller is able to control the heating/cooling system 143, the lighting system 141, the warning/message light system 142 and the deployment/stowage mechanism (not shown) of the seat 110.

Figure 2:
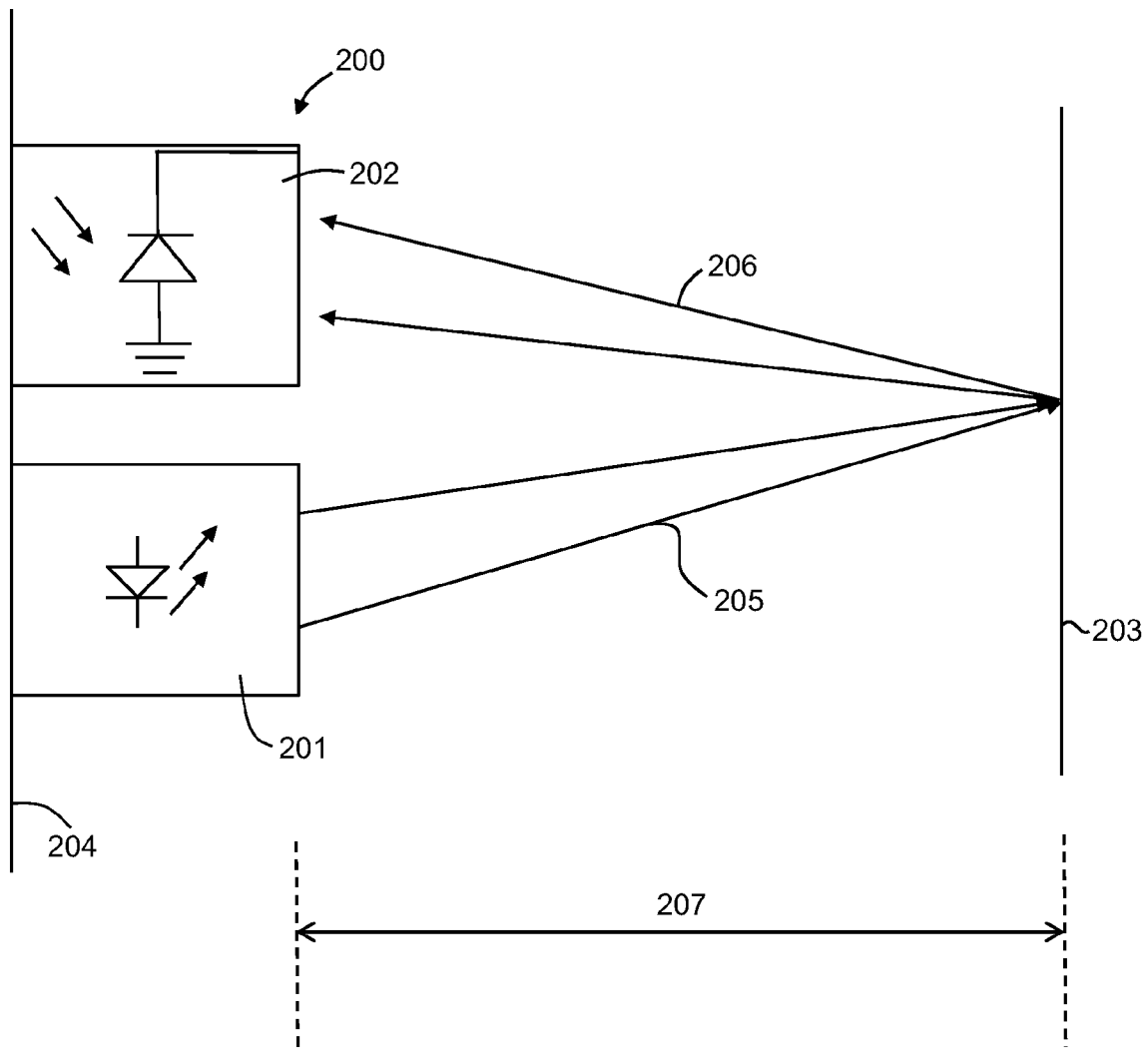
FIG. 2 shows a schematic view of a sensor arrangement used with the aircraft suite of FIG. 1 and other Figures.

The suite also comprises a sensor assembly (200, not shown in FIG. 1, but described in more detail in relation to FIG. 2). The sensor assembly measures a distance within the suite (between two locations within the suite) and provides a distance input (which is indicative of the distance measured) to a distance input receiver of the controller.

The controller does the controlling of the systems based on a logic condition it receives from a logic condition receiver of the controller and the distance input it receives from the distance input receiver of the controller.

FIG. 2 shows a schematic view of a sensor arrangement 200 used with the aircraft suite of FIG. 1 and other Figures. The sensor arrangement 200 comprises a signal emitter 201 and a signal receiver 202 mounted adjacent each other on a first surface 204 within the aircraft suite 100. The signal emitter emits an infrared signal 205 that is reflected by an object 203, as reflected signal 206, back to the signal receiver 202. The signal emitter 201 and signal receiver 202 are connected such that the time lag between the signal being emitted and then being received is known. That time lag corresponds to a distance 207 (from the sensor arrangement 200 to the object 203) that is being measured, the sensor arrangement 200 is then able to provide the distance input (corresponding to the distance measured 207) to the distance input receiver of the controller.

In the following figures, specific examples of the control function of various aircraft suites 100 will be given. These examples are illustrated with aircraft suites 100 that differ from the design of suite 100 in FIG. 1. However, the features of the suites are similar, unless otherwise stated, and so will be described with reference to like reference numerals. In each example, the sensor (or sensor arrangement) is illustrated by reference numeral 200 (or 200a, 200b if more than one sensor is provided in the suite). This corresponds to the sensor arrangement 200 in FIG. 2.

Figure 3A:
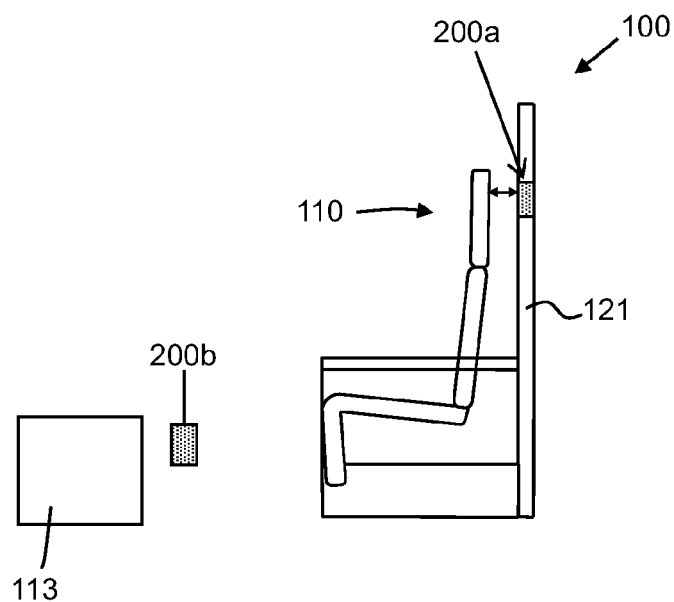
FIG. 3a shows a side view of part of an aircraft suite according to a second embodiment of the invention, the view showing a seat in an upright (seat) configuration.

FIG. 3a shows a side view of part of an aircraft suite 100 according to a second embodiment of the invention, the view showing a seat 110 in an upright (seat) configuration. Behind the seat 110 is located a part of the suit shroud 121. In front of the seat 100 is located the ottoman 113.

As can be seen in this Figure, there are two sensors 200a, 200b present. One, 200a, is located on the shroud 121 behind the seat 110 at a height corresponding to the height of the headrest of the seat 110. It measures the distance from the shroud 121 to the object nearest to it in the direction of the headrest. The other, 200b, is located near the ottoman 113. It measures the distance from the sensor 200b to the nearest object in the direction of the ottoman 113.

When the seat is being deployed so as to move towards its bed configuration, the "logic condition" input of the aircraft suite state of "furniture being deployed" is sent to the logic condition input of the controller. If the distance measured by the sensor 200a corresponds to the expected distance of the headrest, the distance input sent to the distance input receiver of the controller is such that the controller does not stop the deployment motion. However, if, for example a passenger arm is placed in between the back of the headrest and the shroud 121, the distance measured would be less than expected and the distance input sent would be such as to cause the controller to cease the deployment motion by the deployment mechanism of the seat 110. If the arm, or other object, is then moved out of the way of the sensor 200a, the deployment motion may be re-commenced.

Figure 3B:
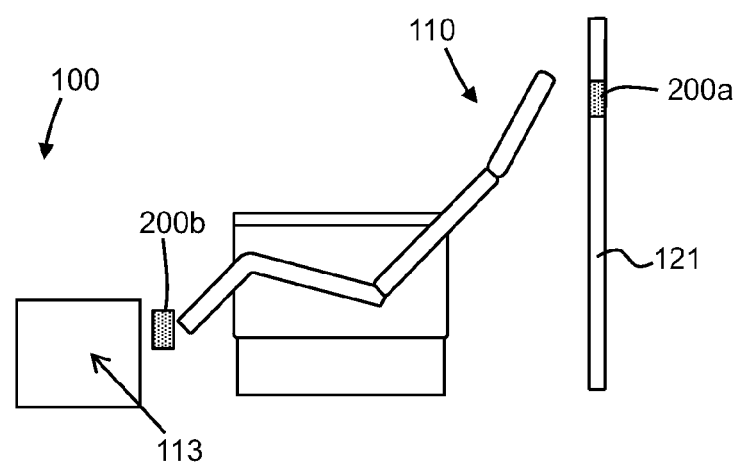
FIG. 3b shows a side view of the seat in FIG. 3a, in a reclined (partial bed) configuration.

FIG. 3b shows a side view of the seat in FIG. 3a, in a reclined (partial bed) configuration. Here, it can be seen that a leg portion of the seat 110 is approaching the ottoman 113. When the seat is being deployed so as to move further towards its bed configuration, the "logic condition" input of the aircraft suite state of "furniture being deployed" is sent to the logic condition input of the controller. If the distance measured by the sensor 200b corresponds to the expected distance of the ottoman, the distance input sent to the distance input receiver of the controller is such that the controller does not stop the deployment motion. However, if, for example a passenger foot is placed in between the back of the ottoman 113 and the sensor 200b, the distance measured would be less than expected and the distance input sent would be such as to cause the controller to cease the deployment motion by the deployment mechanism of the seat 110. If the foot, or other object, is then moved out of the way of the sensor 200b, the deployment motion may be re-commenced.

Figure 4:
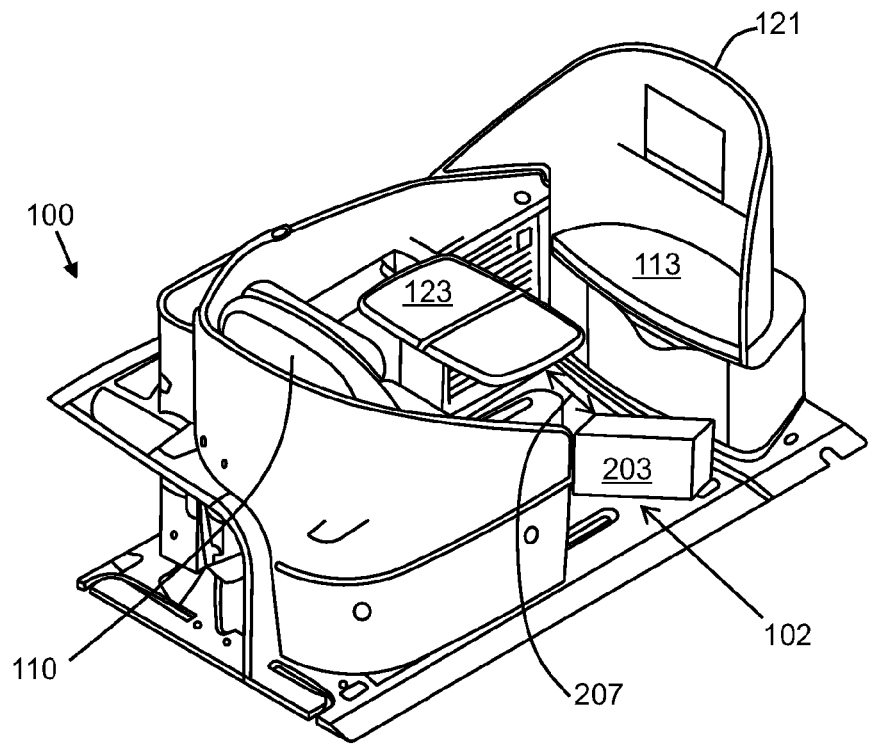
FIG. 4 shows a perspective view of an aircraft suite, in accordance with a third embodiment of the invention.

FIG. 4 shows a perspective view of an aircraft suite 100, in accordance with a third embodiment of the invention. Here, a piece of luggage 203 is located in the open area 102 of the suite 100. A sensor 200 (not shown) is used to measure the distance 207 from a location underneath the table 123, where the sensor 200 is, in a direction towards the luggage 203. As the sensor 200 would then detect a distance less than expected, this distance input is sent to the distance input receiver of the controller. As the aircraft, at that time, is in an aircraft state of "ready for TTL", this logic condition input is sent to the logic input receiver of the controller. The controller is programmed, in the scenario of both of those inputs, to ensure a warning light or message is displayed by the warning light/message system 142. This alerts the passenger to the fact that they should place the luggage 203 elsewhere.

Figure 5:
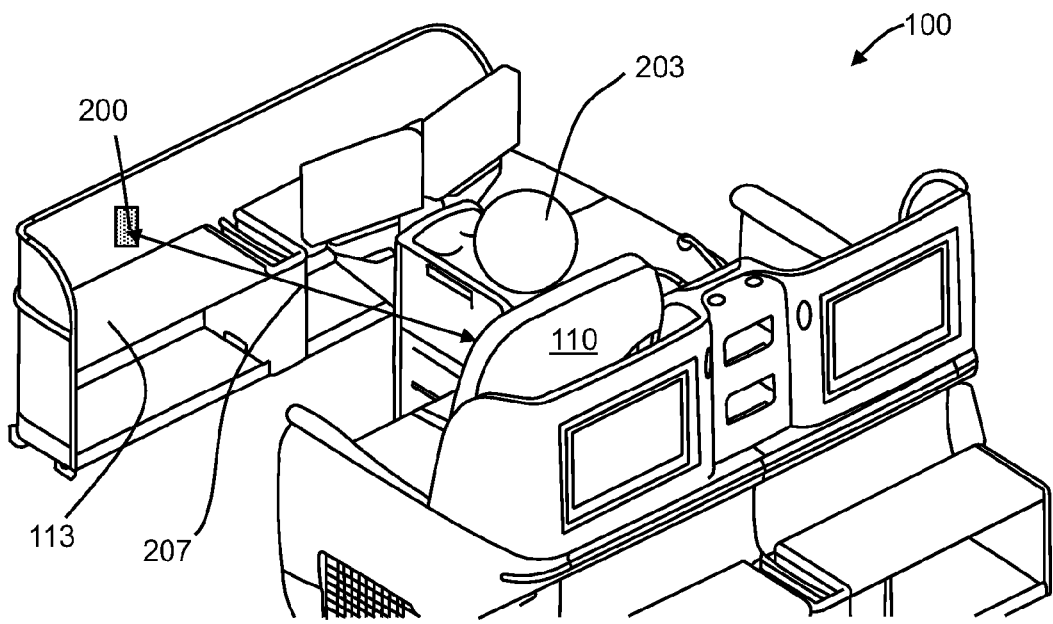
FIG. 5 shows a perspective view of part of an aircraft suite, in accordance with a fourth embodiment of the invention.

FIG. 5 shows a perspective view of part of an aircraft suite 100, in accordance with a fourth embodiment of the invention. Here, a passenger 203 is located on the seat 110. A sensor 200 is used to measure the distance from a location opposite the seat 110, above the ottoman 113, where the sensor 200 is, in a direction towards the seat 110. As the sensor 200 would then detect a distance 207 less than expected, because of the presence of the passenger 203 in the seat 110, this distance input is sent to the distance input receiver of the controller. As the aircraft, at that time, is in a state of "in flight", this logic condition input is sent to the logic input receiver of the controller. The controller is programmed, in the scenario of both of those inputs, to provide a heating or cooling function through the heating/cooling system 143.

The arrangement of FIG. 5 may also be used to detect when a passenger is or is not in the seat for a different purpose. For example, if the passenger is not in the seat and the logic condition input is the aircraft state of "ready for TTL" or "experiencing turbulence" (possibly in combination with an input indicating that the seat is booked for the flight), a warning light or message may be displayed within the suite 100.

Figure 6:
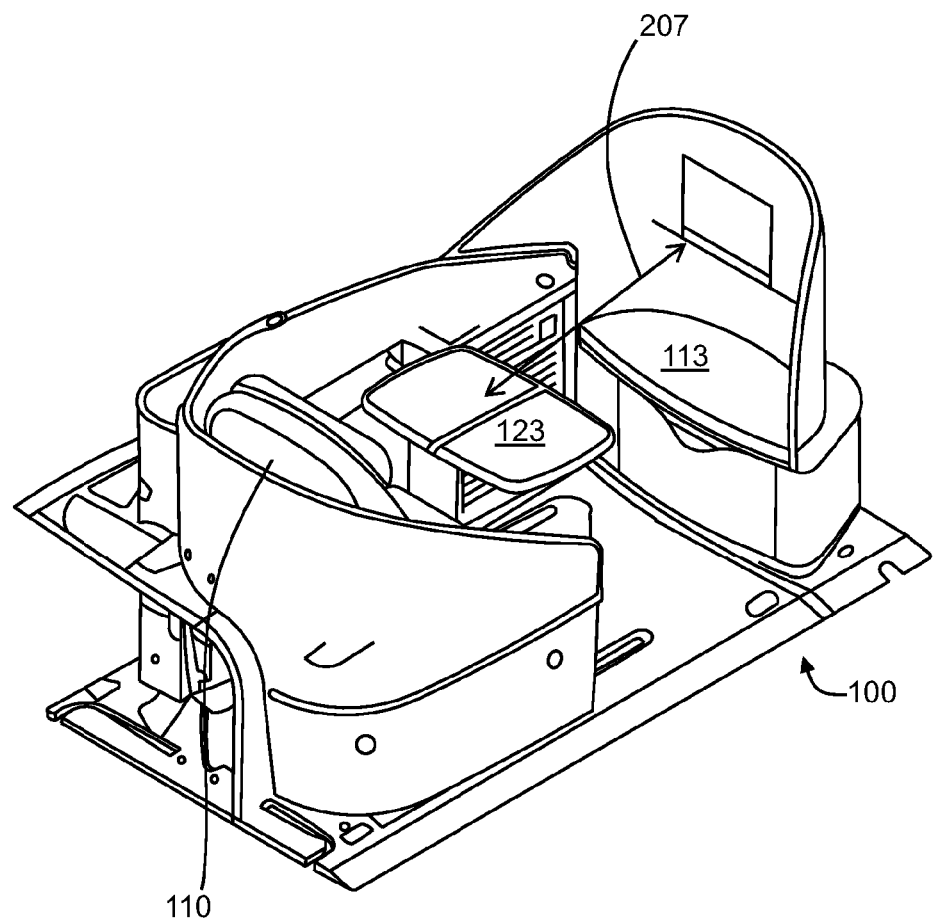
FIG. 6 shows a perspective view of an aircraft suite, in accordance with a fifth embodiment of the invention.

FIG. 6 shows a perspective view of an aircraft suite 100, in accordance with a fifth embodiment of the invention. Here, the table 123 is deployed. A sensor 200 (not shown) is used to measure the distance 207 from a location opposite the seat 110, above the ottoman 113, where the sensor 200 is, in a direction towards the table 123. As the sensor would then detect a distance 207 less than expected, because of the deployed configuration of the table 123, this distance input is sent to the distance input receiver of the controller. As the aircraft, at that time, is in an aircraft state of "ready for TTL", this logic condition input is sent to the logic input receiver of the controller. The controller is programmed, in the scenario of both of those inputs, to ensure a warning light or message is displayed by the warning light/message system 142. This alerts the passenger to the fact that they should stow the table 123.

Figure 7A:
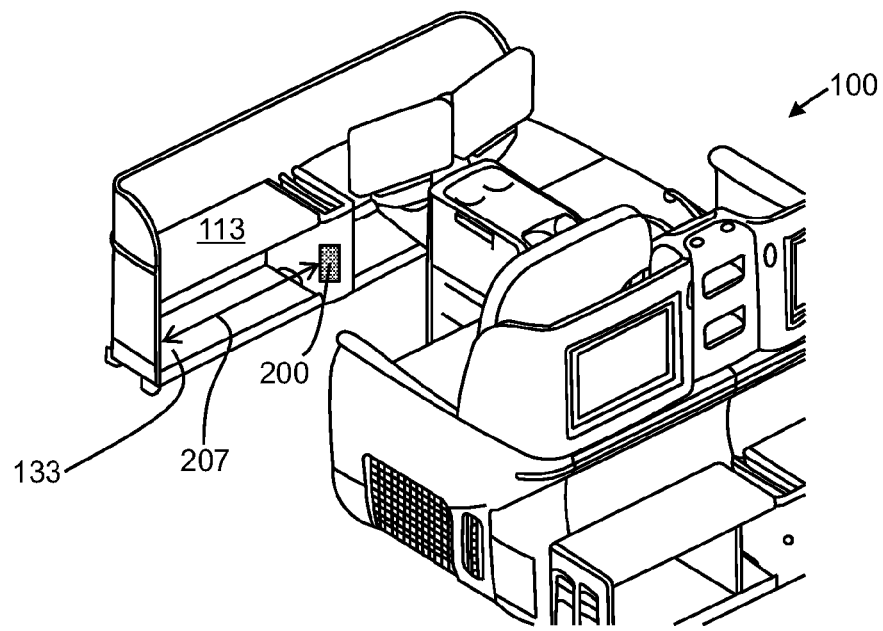
FIG. 7a shows a perspective view of an aircraft suite, in accordance with a sixth embodiment of the invention.

FIG. 7a shows a perspective view of an aircraft suite 100, in accordance with a sixth embodiment of the invention. Here, there are no objects in storage area 133 under the ottoman 113. A sensor 200 is located within the storage area 133 and is used to measure the distance 207 from the sensor 200 on one side of the area 133 to the other side of the area 133. As the sensor 200 detects a distance 207 as expected (i.e. with no luggage/other objects in the way), this distance input is sent to the distance input receiver of the controller. As the aircraft, at that time, is in an aircraft state of "landed", this logic condition is sent to the logic input receiver of the controller. The controller is programmed, in the scenario of the logic condition being "landed" and the distance 207 being less than expected (because of a piece of luggage 204, in the area 133, for example) to ensure a warning light or message is displayed by the warning light/message system 142. This alerts the passenger to the fact that they should remember to remove their luggage on disembarking the aircraft. In the case here, there is no luggage in area 133 so no warning light or message is displayed, despite the logic condition input being "landed".

Figure 7B:
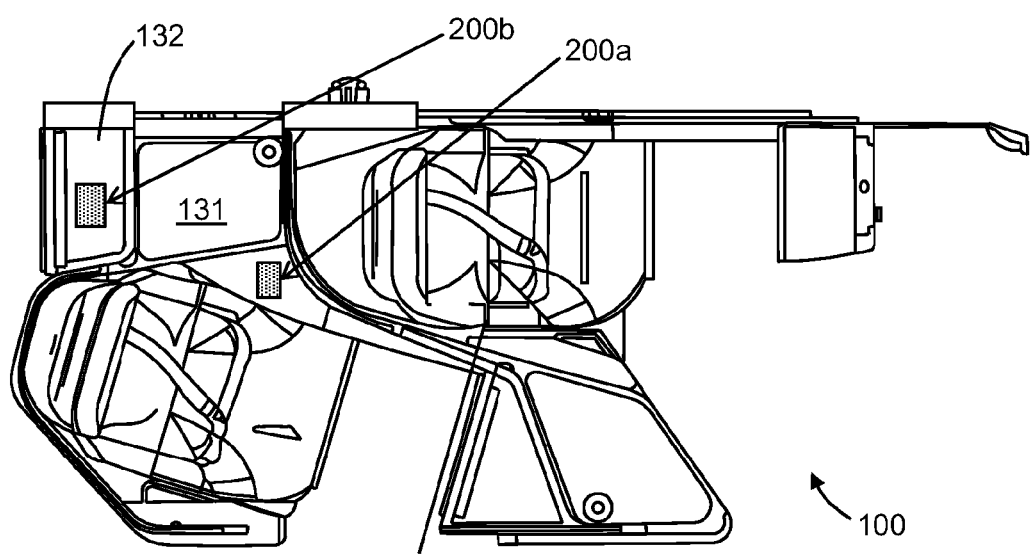
FIG. 7b shows a plan view of an aircraft suite, in accordance with a seventh embodiment of the invention.

FIG. 7b shows a plan view of an aircraft suite 100, in accordance with a seventh embodiment of the invention. Here, there are two storage areas 131, 132, each with a sensor associated with them, 200a and 200b respectively. These sensors 200a, 200b and the control function works in a similar way to that described above in relation to FIG. 7a.

Figure 8:
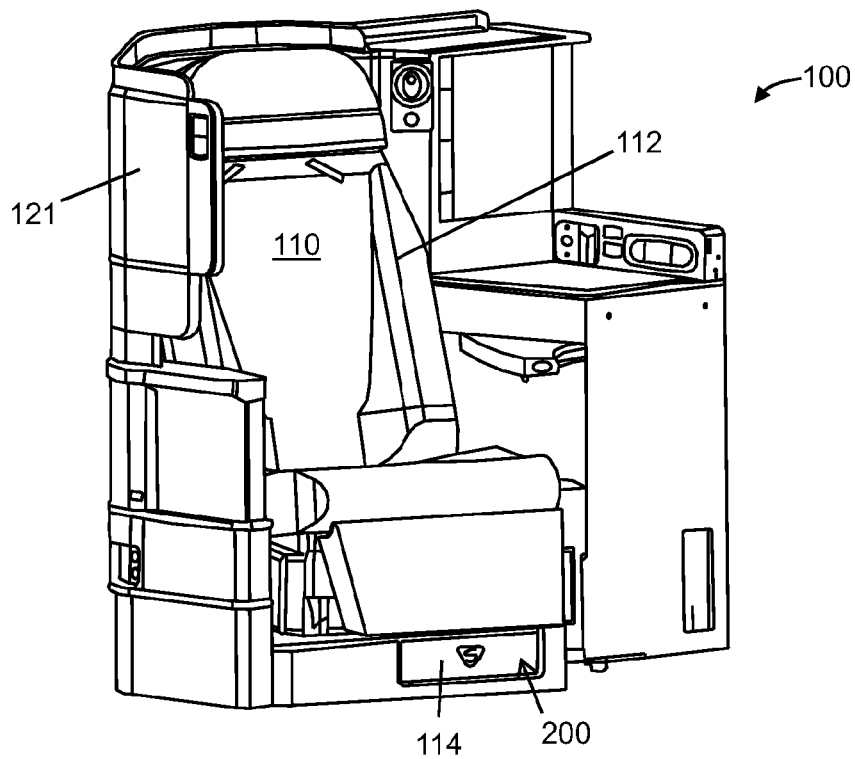
FIG. 8 shows a perspective view of part of an aircraft suite, in accordance with an eighth embodiment of the invention.

FIG. 8 shows a perspective view of part of an aircraft suite 100, in accordance with an eighth embodiment of the invention. Here, a sensor 200 is located in a lifejacket compartment 114 under the seat 110. The sensor 200 is used to measure the distance 207 from a location on one side of the lifejacket compartment towards the other side. If the lifejacket is not present in the compartment 114 the sensor 200 would then detect a distance longer than expected and this distance input is sent to the distance input receiver of the controller. As the aircraft, at that time, is in an aircraft state of "lifejacket inspection check", this logic condition is sent to the logic input receiver of the controller. The controller is programmed, in the scenario of both of those inputs, to ensure a warning light or message is displayed by the warning light/message system 142. This alerts the inspection crew to the absence of the lifejacket from the compartment 114.

Figure 9:
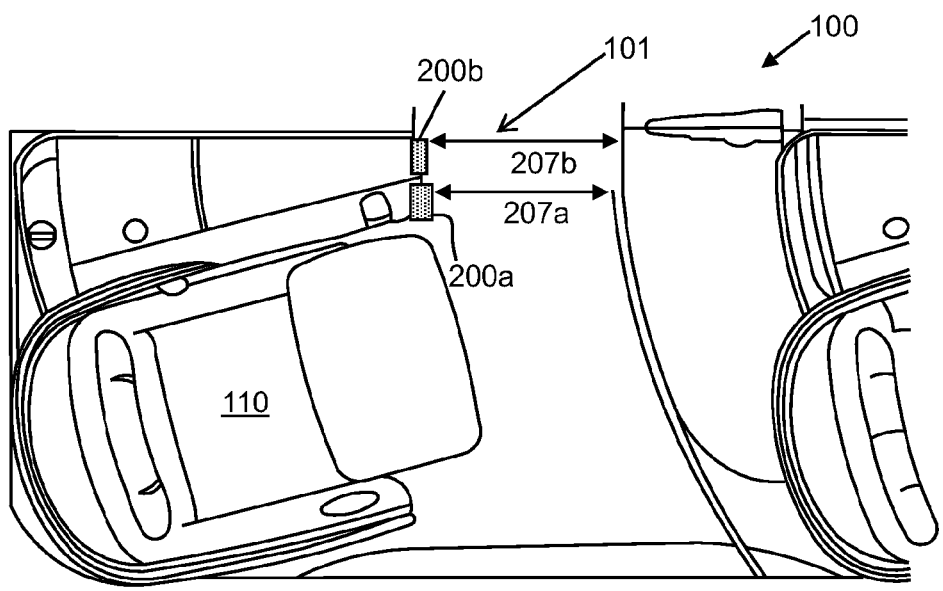
FIG. 9 shows a plan view of an aircraft suite, in accordance with a ninth embodiment of the invention.

FIG. 9 shows a plan view of an aircraft suite 100, in accordance with a ninth embodiment of the invention. Here, there are two sensors 200a, 200b both located on one side of the entrance/exit 101 to the suite 100. They detect the distance from their location towards the nearest object on the other side of the entrance/exit 101. Hence, when a passenger crosses the entrance/exit, the distance input receiver receives an input that indicates that a passenger has done so. If the logic condition input relates to the aircraft state of "boarding" the controller is programmed to control display of a welcome message or a welcome lighting display.

Having two sensors 200a, 200b enables the controller to work out whether the passenger is entering or exiting the suite 100. The controller may only display the welcome message/lighting upon the passenger entering.

The arrangement of FIG. 9 may also be used to detect when a passenger exits or enters the suite during a night phase of the flight. The controller can then provide subtle lighting to allow the passenger to find their way in/out of the suite easily. The logic condition input that is used in this example may be a cabin state of "lights dimmed for nighttime", a suite state of "seat in bed configuration", or a suite state of "lights low/off" or a combination of all three.

Figure 10:
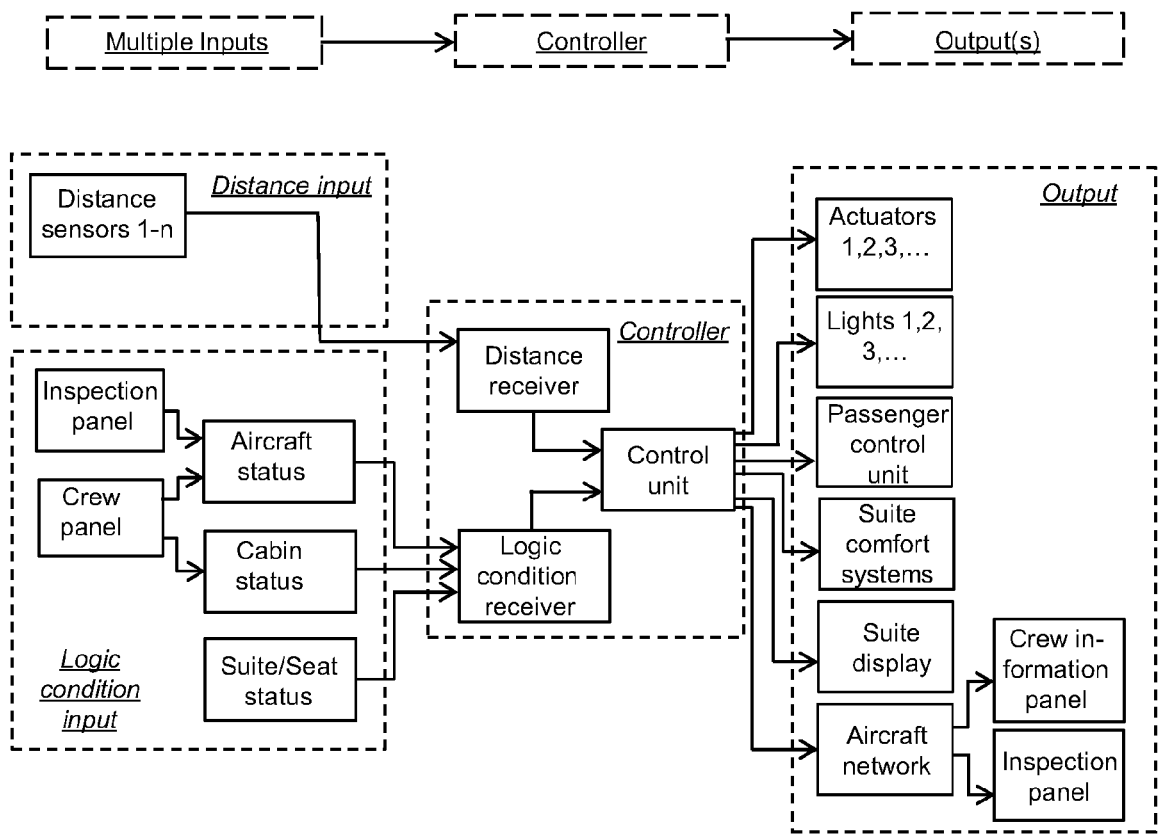
FIG. 10 shows a schematic view of the control arrangement for use within any of the aircraft suites described.

FIG. 10 shows a schematic view of the control arrangement for use within any of the aircraft suites described.

The control arrangement comprises multiple inputs (on the left hand side of the figure), a controller (in the middle) and a number of outputs (on the right hand side).

A number of distance sensors (1 to n) (reference numeral 200), provide a distance input to the distance receiver of the controller. A logic condition input (either the aircraft status, cabin status or suite/seat status) is provided to a logic condition receiver of the controller. An inspection panel may provide the aircraft status. A crew panel may provide the aircraft status and/or the cabin status.

A control unit of the controller is programmed to provide a certain output signal, on the basis of the distance input received by the distance receiver and the logic condition input received by the logic condition receiver.

The output signal is sent to any of a number of actuators or lights, such as lighting system 141 and/or warning light/message light system 142, or a passenger control unit, suite comfort system, such as heating/cooling system 143, suite display and/or aircraft network. The aircraft network can provide the output signal to a crew information panel or an inspection panel.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The controller may be connected to a warning light/warning message display system outside of the aircraft suite 100, For example, such a warning etc. may be displayed to a member of aircraft or inspection crew on a centralized panel showing the relevant warning etc. for a number of different aircraft suites.

The signal emitter 201 and signal receiver 202 of the sensor 200 may be located to different surfaces within the suite, as opposed to being mounted adjacent each other on the same surface 204.

The signal emitted and received may be an ultrasound signal, rather than an infra-red signal. It may instead be any suitable frequency signal.

The heating/cooling system 143 may comprise an air conditioning system, a heating device, a cooling device, a circulation system, or any combination of these.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

It should be noted that throughout this specification, "or" should be interpreted as "and/or".

The invention claimed is:

1. An aircraft suite comprising an aircraft seat for use by a passenger, the aircraft suite also comprising:
   a controller, for controlling a number of output states of the aircraft suite, the controller having a logic condition receiver for receiving a logic condition input, and
   distance measurement equipment, for measuring a distance between a first location within the suite and a second location within the suite, and providing a distance input to a distance receiver of the controller,
wherein, in use, the controller controls at least one of the output states of the aircraft suite based upon both the logic condition input and the distance input,
wherein the distance measurement equipment comprises a signal emitter for emitting a signal at a first time, and a signal receiver, for receiving the signal at a second time, a time lag between the first and second times corresponding to the distance being measured,
wherein the signal emitter and signal receiver are located substantially adjacent each other at the first location and wherein an object at the second location reflects the signal emitted from the signal emitter back to the signal receiver,
wherein the first location within the aircraft suite is on a piece of furniture of the aircraft suite,
wherein the piece of furniture is fixedly mounted within the aircraft suite,
wherein the second location within the aircraft suite corresponds to a location of at least part of a moveable object within the aircraft suite,
wherein the moveable object is a moveable item of furniture of the aircraft suite, a passenger or a piece of luggage.

2. An aircraft suite as claimed in claim 1, wherein the logic condition input relates to an aircraft state, an aircraft cabin state and/or an aircraft suite state.

3. An aircraft suite as claimed in claim 2, wherein the logic condition input relates to an aircraft state and wherein the aircraft state represents a status of the aircraft, such as: "boarding", "ready for take-off, taxi or landing (TTL)", "in flight", "experiencing turbulence", "landed" and/or "life-jacket inspection check".

4. An aircraft suite as claimed in claim 2, wherein the logic condition input relates to an aircraft cabin state and wherein the aircraft cabin state represents a status of the aircraft cabin, such as: "lights dimmed for night-time".

5. An aircraft suite as claimed in claim 2, wherein the logic condition input relates to an aircraft suite state and wherein the aircraft suite state represents a status of the aircraft suite, such as: "seat in bed configuration", "lights low/off", "furniture being deployed" and/or "furniture being stowed".

6. An aircraft suite as claimed in claim 1, wherein the output state controlled by the controller helps provide a desired or required aircraft suite environment and may relate to a light level of the aircraft suite, a temperature of the aircraft suite or a part of the suite, a message or warning displayed within the suite, a message or warning displayed externally to the suite and/or a deployment/stowage condition of a piece of furniture of the suite.

7. An aircraft suite as claimed in claim 1, wherein the second location is the nearest object to the first location in a path of deployment/stowage of a piece of furniture, wherein the logic condition input relates to an aircraft suite state of deployment/stowage of the item of furniture, and wherein the output state controlled is deployment/stowage of the piece of furniture, such that, in use, if the distance measurement equipment measures a shorter distance than expected, indicating a passenger or item of luggage may be in the path of deployment/stowage, and the piece of furniture is being deployed/stowed, then the controller controls the output state such that deployment/stowage movement of the item of furniture is ceased.

8. A method of controlling an environment within an aircraft suite, the aircraft suite comprising an aircraft seat for use by a passenger, the method comprising the steps of:
measuring a distance between a first location within the suite and a second location within the suite, and providing a distance input,
providing a logic condition input, and
controlling a number of output states of the aircraft suite, based upon both the logic condition input and the distance input,
wherein the distance is measured using distance measurement equipment comprising a signal emitter for emitting a signal at a first time, and a signal receiver, for receiving the signal at a second time, a time lag between the first and second times corresponding to the distance being measured,
wherein the signal emitter and signal receiver are located substantially adjacent each other at the first location and wherein an object at the second location reflects the signal emitted from the signal emitter back to the signal receiver,
wherein the first location within the aircraft suite is on a piece of furniture of the aircraft suite,
wherein the piece of furniture is fixedly mounted within the aircraft suite,
wherein the second location within the aircraft suite corresponds to a location of at least part of a moveable object within the aircraft suite,
wherein the moveable object is a moveable item of furniture of the aircraft suite, a passenger or a piece of luggage.

* * * * *